(12) United States Patent
Fereshtehkhou et al.

(10) Patent No.: US 6,797,357 B2
(45) Date of Patent: Sep. 28, 2004

(54) THREE DIMENSIONAL STRUCTURES USEFUL AS CLEANING SHEETS

(75) Inventors: Saeed Fereshtehkhou, Cincinnati, OH (US); Paul Joseph Russo, Loveland, OH (US); Wilbur Cecil Strickland, Jr., Loveland, OH (US); Nicola John Policicchio, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/881,473

(22) Filed: Jun. 14, 2001

(65) Prior Publication Data

US 2001/0051479 A1 Dec. 13, 2001

Related U.S. Application Data

(62) Division of application No. 09/082,396, filed on May 20, 1998.
(60) Provisional application No. 60/055,330, filed on Aug. 12, 1997, and provisional application No. 60/047,619, filed on May 23, 1997.

(51) Int. Cl.[7] .............................. B32B 3/00; B32B 5/26; B32B 27/12
(52) U.S. Cl. ....................... 428/141; 428/156; 428/172; 442/35; 442/96; 442/152; 442/153; 442/159; 442/168; 442/170; 442/171; 442/408
(58) Field of Search .................................. 428/141, 156, 428/172; 442/35, 96, 152, 153, 159, 168, 170, 171, 408, 1, 43, 49, 57, 164, 165, 400

(56) References Cited

U.S. PATENT DOCUMENTS

| D50,686 S | 5/1917 | Hatch |
|---|---|---|
| D133,264 S | 8/1942 | Perkins |
| 2,325,903 A | 8/1943 | Blair et al. |
| D161,221 S | 12/1950 | Walther |
| D172,703 S | 7/1954 | Bull |
| 2,957,512 A | 10/1960 | Wade et al. |
| 3,025,199 A | 3/1962 | Harwood |
| 3,033,721 A | 5/1962 | Kalwaites |
| 3,047,444 A | 7/1962 | Harwood |
| 3,485,706 A | 12/1969 | Evans |
| 3,494,821 A | 2/1970 | Evans |
| 3,575,764 A | 4/1971 | McFarren |
| 3,597,299 A | 8/1971 | Thomas et al. |
| 3,616,157 A | 10/1971 | Smith |
| 3,619,251 A | 11/1971 | Stiles, Sr. |
| 3,629,047 A | 12/1971 | Davison |
| 3,673,060 A | 6/1972 | Murphy et al. |
| 3,687,754 A | 8/1972 | Stumpf |
| 3,687,797 A | 8/1972 | Wideman |

(List continued on next page.)

FOREIGN PATENT DOCUMENTS

| CA | 1189296 | 6/1985 |
|---|---|---|
| CA | 2013790 | 11/1990 |
| CA | 2016288 | 11/1990 |
| CA | 2038754 | 11/1991 |
| CA | 2156958 | 3/1996 |
| EP | 0 032 793 A2 | 7/1981 |
| EP | 0 084 963 A2 | 8/1983 |

(List continued on next page.)

Primary Examiner—Ula C. Ruddock
(74) Attorney, Agent, or Firm—Thibault Fayette; Jason J. Camp; Kim William Zerby

(57) ABSTRACT

Disclosed are cleaning sheets having substantial macroscopic three-dimensionality. Optionally, the macroscopically three-dimensional cleaning sheets can comprise a contractable material (e.g., a scrim material), which when heated and then cooled contracts so as to provide a macroscopic, three-dimensional structure. Macroscopic three-dimensionality is described in terms of "average peak-to-peak distance" and "surface topography index", as well in terms of "average height differential". Also disclosed are cleaning implements comprising a handle and the described cleaning sheets. Processes for the sheets, benefits of the processes, and articles of manufacture are also disclosed.

77 Claims, 5 Drawing Sheets

U.S. PATENT DOCUMENTS

| | | |
|---|---|---|
| 3,695,985 A | 10/1972 | Brock et al. |
| 3,708,361 A | 1/1973 | Stumpf |
| 3,755,062 A | 8/1973 | Schrimer |
| 3,775,231 A | 11/1973 | Thomas |
| 3,794,537 A | 2/1974 | Rahmes |
| 3,953,638 A | 4/1976 | Kemp |
| 3,965,518 A | 6/1976 | Muoio |
| 3,965,519 A | 6/1976 | Hermann |
| 4,001,472 A | 1/1977 | Thomas et al. |
| 4,064,061 A * | 12/1977 | Henry .................. 106/10 |
| 4,097,638 A | 6/1978 | Videen |
| 4,144,370 A | 3/1979 | Boulton |
| 4,188,447 A | 2/1980 | Ehlenz |
| 4,207,367 A | 6/1980 | Baker, Jr. |
| 4,239,792 A | 12/1980 | Ludwa |
| 4,342,314 A | 8/1982 | Radel et al. |
| 4,355,425 A | 10/1982 | Jones et al. |
| 4,412,879 A | 11/1983 | Ottaviano |
| 4,418,123 A | 11/1983 | Bunnelle et al. |
| 4,426,417 A | 1/1984 | Meitner et al. |
| 4,436,780 A | 3/1984 | Hotchkiss et al. |
| 4,522,863 A | 6/1985 | Keck et al. |
| 4,543,099 A | 9/1985 | Bunnelle et al. |
| 4,600,620 A | 7/1986 | Lloyd et al. |
| 4,606,964 A | 8/1986 | Wideman |
| 4,609,518 A | 9/1986 | Curro et al. |
| D287,433 S | 12/1986 | Ellers |
| 4,634,621 A | 1/1987 | Manning et al. |
| 4,636,419 A | 1/1987 | Madsen et al. |
| 4,636,429 A | 1/1987 | Morell et al. |
| 4,637,949 A | 1/1987 | Manning et al. |
| 4,666,621 A | 5/1987 | Clark et al. |
| 4,683,001 A | 7/1987 | Floyd et al. |
| 4,704,321 A | 11/1987 | Zafiroglu |
| 4,731,276 A | 3/1988 | Manning et al. |
| 4,741,944 A | 5/1988 | Jackson et al. |
| 4,769,265 A | 9/1988 | Coburn, Jr. |
| 4,772,501 A | 9/1988 | Johnson et al. |
| 4,773,238 A | 9/1988 | Zafiroglu |
| 4,778,644 A | 10/1988 | Curro et al. |
| 4,781,966 A | 11/1988 | Taylor |
| 4,808,467 A | 2/1989 | Suskind et al. |
| 4,820,579 A | 4/1989 | Aszman |
| D301,088 S | 5/1989 | Kawaguchi |
| 4,880,682 A | 11/1989 | Hazelton et al. |
| 4,891,258 A | 1/1990 | Fahrenkrug |
| 4,904,524 A | 2/1990 | Yoh |
| 4,941,995 A | 7/1990 | Richards |
| 4,946,617 A | 8/1990 | Sheridan et al. |
| 4,948,653 A | 8/1990 | Dinter et al. |
| 4,987,632 A | 1/1991 | Rowe et al. |
| 5,065,887 A | 11/1991 | Schuh et al. |
| 5,093,190 A | 3/1992 | Kwok et al. |
| 5,144,729 A | 9/1992 | Austin et al. |
| 5,165,979 A | 11/1992 | Watkins et al. |
| 5,198,293 A | 3/1993 | Metrick |
| 5,203,186 A | 4/1993 | Zafiroglu |
| 5,227,228 A | 7/1993 | Newell |
| D341,944 S | 12/1993 | Peter |
| 5,277,761 A | 1/1994 | VanPhan et al. |
| 5,280,664 A | 1/1994 | Lin |
| 5,310,590 A | 5/1994 | Tochacek et al. |
| 5,334,446 A | 8/1994 | Quantrille et al. |
| 5,342,436 A * | 8/1994 | Thrasher .................. 106/10 |
| 5,369,858 A * | 12/1994 | Gilmore et al. ............ 28/104 |
| 5,470,648 A | 11/1995 | Pearlman et al. |
| 5,478,412 A | 12/1995 | Simon et al. |
| D370,127 S | 5/1996 | Bonaddio et al. |
| 5,525,397 A * | 6/1996 | Shizuno et al. ............ 15/208 |
| 5,536,555 A * | 7/1996 | Zelazoski et al. .......... 428/138 |
| 5,576,090 A | 11/1996 | Suzuki |
| 5,591,239 A | 1/1997 | Larson et al. |
| 5,595,567 A | 1/1997 | King et al. |
| 5,599,550 A | 2/1997 | Kohlruss et al. |
| 5,618,610 A | 4/1997 | Tomita et al. |
| 5,620,779 A | 4/1997 | Levy et al. |
| 5,674,591 A | 10/1997 | James et al. |
| 5,683,787 A | 11/1997 | Boich et al. |
| 5,756,112 A * | 5/1998 | Mackey .................. 424/402 |
| 5,769,993 A | 6/1998 | Baldauf |
| 5,830,558 A | 11/1998 | Barnholtz |
| 5,843,279 A | 12/1998 | Phan et al. |
| 5,874,159 A | 2/1999 | Cruise et al. |
| 6,087,279 A | 7/2000 | Laun |
| D429,589 S | 8/2000 | Denney |
| 6,117,525 A | 9/2000 | Trokhan et al. |
| D454,433 S | 3/2002 | Peter |
| D478,494 S | 8/2003 | Arnold |
| 2003/0171051 A1 | 9/2003 | Bergsten et al. |

FOREIGN PATENT DOCUMENTS

| | | |
|---|---|---|
| EP | 0 211 773 A2 | 2/1987 |
| EP | 0 357 496 A2 | 3/1990 |
| EP | 0 428 024 A2 | 5/1991 |
| EP | 0 452 727 A1 | 10/1991 |
| EP | 696 432 | 2/1996 |
| EP | 0447 229 A2 | 5/1997 |
| EP | 0 872 206 A1 | 10/1998 |
| GB | 948614 A | 2/1964 |
| GB | 1 331 817 | 9/1973 |
| GB | 1 454 403 A | 11/1976 |
| JP | 3-48981 | 10/1988 |
| JP | 04288113 A | 10/1992 |
| JP | 04297215 A | 10/1992 |
| JP | 04312430 A | 11/1992 |
| JP | 05-025763 | 2/1993 |
| JP | 05-056902 A | 3/1993 |
| JP | 05-093350 | 4/1993 |
| JP | 05-192285 | 8/1993 |
| JP | 05245090 A | 9/1993 |
| JP | 06-014859 A | 1/1994 |
| JP | 6-017361 | 1/1994 |
| JP | 06311954 A | 11/1994 |
| JP | 8-23189 | 9/1996 |
| JP | 08-243065 A | 9/1996 |
| JP | 10005164 A | 1/1998 |
| JP | 10-127547 A | 5/1998 |
| JP | 200034663 A | 2/2000 |
| JP | 2000034659 A | 2/2000 |
| JP | 2000210238 A | 8/2000 |
| WO | WO 93/15245 | 8/1993 |
| WO | WO98-02300 | 1/1998 |
| WO | WO98-02610 | 1/1998 |
| WO | WO 98/23199 | 6/1998 |
| WO | WO 98/52458 A1 | 11/1998 |
| WO | WO 02/064360 A1 | 8/2002 |

* cited by examiner

THREE DIMENSIONAL STRUCTURES USEFUL AS CLEANING SHEETS

CROSS REFERENCE TO RELATED APPLICATIONS

This application is a divisional of U.S. application Ser. No. 09/082,396, filed May 20, 1998, which claims the benefit of U.S. Provisional Application Ser. No. 60/055,330, filed Aug. 12, 1997 and U.S. Provisional Application Ser. No. 60/047,619, filed May 23, 1997.

FIELD OF THE INVENTION

This invention relates to cleaning sheets particularly suitable for removal and entrapment of dust, lint, hair, sand, food crumbs, grass and the like.

BACKGROUND OF THE INVENTION

The use of nonwoven sheets for dry dust-type cleaning are known in the art. Such sheets typically utilize a composite of fibers where the fibers are bonded via adhesive, entangling or other forces. See, for example, U.S. Pat. No. 3,629,047 and U.S. Pat. No. 5,144,729. To provide a durable wiping sheet, reinforcement means have been combined with the staple fibers in the form of a continuous filament or network structure. See, for example, U.S. Pat. No. 4,808,467, U.S. Pat. No. 3,494,821 and U.S. Pat. No. 4,144,370. Also, to provide a product capable of withstanding the rigors of the wiping process, prior nonwoven sheets have employed strongly bonded fibers via one or more of the forces mentioned above. While durable materials are obtained, such strong bonding may adversely impact the materials' ability to pick up and retain particulate dirt. In an effort to address this concern, U.S. Pat. No. 5,525,397 to Shizuno et al. describes a cleaning sheet comprising a polymeric network layer and at least one nonwoven layer, wherein the two layers are lightly hydroentangled so as to provide a sheet having a low entanglement coefficient. The resulting sheet is said to provide strength and durability, as well as improved dust collecting performance because the composite fibers are lightly hydroentangled. Sheets having a low entanglement coefficient (i.e., not more than 500 m) are said to offer better cleaning performance because a greater degree of fibers are available for contact with dirt.

While the sheets described in the '397 patent are alleged to address some of the problems with prior nonwoven cleaning sheets, those sheets appear to be generally of a uniform basis weight, at least on a macroscopic level; and are essentially of a uniform caliper, again on a macroscopic level. That is, ordinary and expected basis weight and caliper fluctuations and variations may occur on a random basis, as a result of fluid pressure differentials during hydroentanglement. However, the structure would not be deemed to comprise discrete regions that differ with regard to basis weight. For example, if on a microscopic level, the basis weight of an interstice between fibers were measured, an apparent basis weight of zero would result when, in fact, unless an aperture in the nonwoven structure was being measured, the basis weight of such region is greater than zero. Such fluctuations and variations are a normal and expected result of the hydroentangling process. The skilled artisan would interpret nonwovens having such variations, including those described in the '397 patent, as having essentially a uniform basis weight and caliper, in the macroscopic sense. The result of a sheet having a uniform basis weight is that the material is not particularly suitable for collecting and entrapping soil of a diverse size, shape, etc.

As such, there is a continuing need to provide cleaning sheets that offer improved soil removal. In this regard, Applicants have found that by providing increased three-dimensionality, in the macroscopic sense, to cleaning sheets, enhanced soil removal is achieved.

Accordingly, it is an object of this invention to overcome the problems of the prior art and particularly to provide a structure more capable of removing and entrapping various types of soil. Specifically, it is an object of this invention to provide a nonwoven structure having significant three-dimensionality, which is described in detail below.

It is another object to provide improved processes for cleaning and desirable benefits for the consumer and user of the sheets, especially by packaging the sheets, either in roll form, with perforations for separating sheets, or means for separating the sheets into useful lengths, and packaging them in packages that inform the consumer of the improved processes and/or the benefits that can be obtained, especially those benefits that are not intuitively obvious to the consumer. It is another object to provide cleaning sheets with additives, especially those that improve adherence of soil to the substrate, and especially for those sheets described hereinafter with three dimensional structure, such combinations having special performance benefits, and such combinations providing improved benefits.

SUMMARY OF THE INVENTION

The present invention relates to a cleaning sheet having substantial macroscopic three-dimensionality. As used herein, the term "macroscopic three-dimensionality", when used to describe three-dimensional cleaning sheets, means the three-dimensional pattern is readily visible to the naked eye when the perpendicular distance between the viewer's eye and the plane of the sheet is about 12 inches. In other words, the three-dimensional structures of the present invention are cleaning sheets that are non-planar, in that one or both surfaces of the sheet exist in multiple planes, where the distance between those planes is observable to the naked eye when the structure is observed from about 12 inches. By way of contrast, the term "planar" refers to cleaning sheets having fine-scale surface aberrations on one or both sides, the surface aberrations not being readily visible to the naked eye when the perpendicular distance between the viewer's eye and the plane of the web is about 12 inches or greater. In other words, on a macroscale, the observer would not observe that one or both surfaces of the sheet exist in multiple planes so as to be three-dimensional.

The macroscopically three-dimensional structures of the present invention optionally comprise a scrim material, which when heated and then cooled, contracts so as to provide a macroscopic three-dimensional structure. Other materials which provide contractile forces so as to provide three-dimensionality are discussed below. Macroscopic three-dimensionality is described herein in terms of "average height differential", which is defined herein as the average distance between adjacent peaks and valleys of a given surface of a sheet, as well as the "average peak-to-peak" distance, which is the average distance between adjacent peaks of a given surface. Macroscopic three-dimensionality is also described in terms of the "Surface Topography Index" of the outward surface(s) of the cleaning sheet; Surface Topography Index is the ratio obtained by dividing the Average Height Differential of a surface by the Average Peak to Peak Distance of that surface. In one embodiment, both of the sheet's outward surfaces will have the described Average Peak to Peak Distance and Surface Topography properties. Methods for measuring Average Peak to Peak Distance and Average Height Differential are described in detail in the Test Method section, below.

The Average Peak to Peak Distance of at least one outward surface will be at least about 1 mm, more preferably at least about 2 mm, and still more preferably at least about 3 mm. In one embodiment, the Average Peak to Peak Distance is from about 1 to about 20 mm, particularly from about 3 to about 16 mm, more particularly from about 4 to about 12 mm. The Surface Topography Index of at least one outward surface will be from about 0.01 to about 10, preferably from about 0.1 to about 5, more preferably from about 0.2 to about 3, still more preferably from about 0.3 to about 2. While the value of the Average Height Differential is not critical, at least one outward surface will preferably have an Average Height Differential of at least about 0.5 mm, more preferably at least about 1 mm, and still more preferably at least about 1.5 mm. The Average Height Differential of at least one outward surface will typically be from about 0.5 to about 6 mm, more typically from about 1 to about 3 mm.

The sheets of this invention and similar sheets, especially those that contain additives at low levels, as described herein, and especially those where the additive is substantially uniformly attached over at least one continuous area, can be used in improved processes for cleaning and to provide desirable benefits for the consumer and user of the sheets, some of those benefits being ones that are not intuitively obvious to a consumer, as detailed hereinafter. It is therefore desirable to package the sheets, either in roll form, with perforations for aiding in separating sheets, or with means for separating the sheets into useful lengths, and/or packaging them in packages that inform the consumer of the improved processes and/or the benefits that can be obtained, especially those benefits that are not intuitively obvious to the consumer. The cleaning sheets with additives, including those with desirable low levels of such additives, preferably substantially uniformly attached, at least in one, or more areas, provide, in combination, special performance benefits, and such combinations can provide improved benefits, especially when the sheets have the desirable structures set forth herein.

DETAILED DESCRIPTION OF THE INVENTION

I. Definitions

Figure 1:
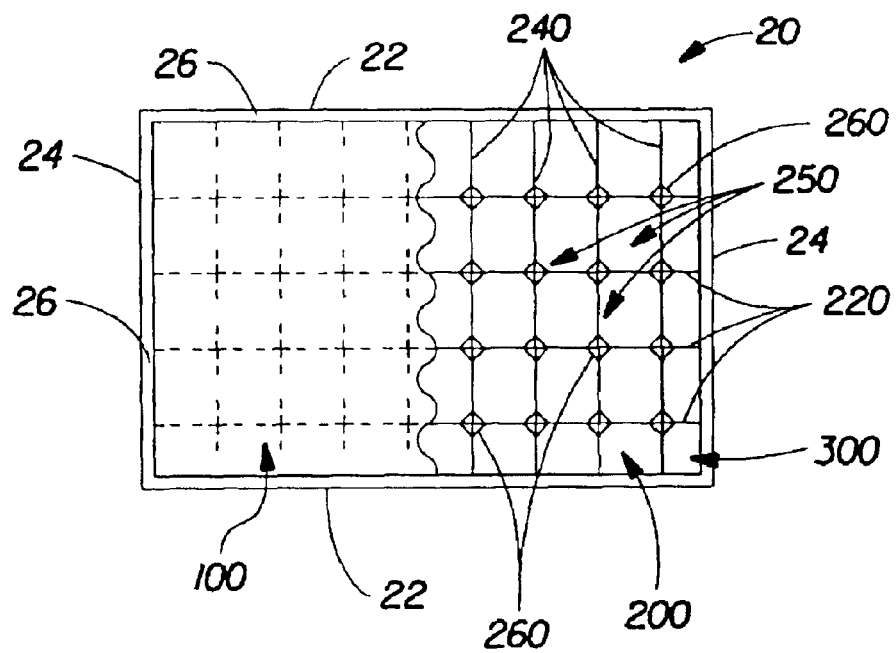
FIG. 1 is a plan view schematic illustration of a three layer embodiment of a cleaning sheet of the present invention, wherein the second layer comprises a scrim material having filaments which run parallel to the side and end edges of the sheet, wherein a portion of the first layer is shown cut away, and wherein surface features of the first layer are omitted for clarity.

As used herein, the tern "comprising" means that the various components, ingredients, or steps, can be conjointly employed in practicing the present invention. Accordingly, the term "comprising" encompasses the more restrictive terms "consisting essentially of" and "consisting of".

As used herein, the term "hydroentanglement" means generally a process for making a material wherein a layer of loose fibrous material (e.g., polyester) is supported on an apertured patterning member and is subjected to water pressure differentials sufficiently great to cause the individual fibers to entangle mechanically to provide a fabric. The apertured patterning member can be formed, e.g., from a woven screen, a perforated metal plate, etc.

As used herein, the term "Z-dimension" refers to the dimension orthogonal to the length and width of the cleaning sheet of the present invention, or a component thereof. The Z-dimension usually corresponds to the thickness of the sheet.

As used herein, the term "X-Y dimension" refers to the plane orthogonal to the thickness of the cleaning sheet, or a component thereof. The X and Y dimensions usually correspond to the length and width, respectively, of the sheet or a sheet component.

As used herein, the term "layer" refers to a member or component of a cleaning sheet whose primary dimension is X-Y, i.e., along its length and width. It should, be understood that the term layer is not necessarily limited to single layers or sheets of material. Thus the layer can comprise laminates or combinations of several sheets or webs of the requisite type of materials. Accordingly, the term "layer" includes the terms "layers" and "layered."

For purposes of the present invention, an "upper" layer of a cleaning sheet is a layer that is relatively further away from the surface that is to be cleaned (i.e., in the implement context, relatively closer to the implement handle during use). The term "lower" layer conversely means a layer of a cleaning sheet that is relatively closer to the surface that is to be cleaned (i.e., in the implement context, relatively further away from the implement handle during use).

All percentages, ratios and proportions used herein are by weight unless otherwise specified.

II. Cleaning Sheets

The present invention relates to a cleaning sheet useful for removing dust, lint, hair, grass, sand, food crumbs and other matter of various size, shape, consistency, etc., from a variety of surfaces. Preferably, the cleaning sheets will demonstrate improved cleaning performance in consumer panel testing.

As a result of the ability of the cleaning sheets to reduce, or eliminate, by various means, including contacting and holding, dust, lint and other airborne matter from surfaces, as well as from the air, the sheets will provide greater reduction in the levels of such materials on surfaces and in the atmosphere, relative to other products and practices for similar cleaning purposes. This ability is especially apparent in sheets containing additives as described herein. Even the sheets of U.S. Pat. No. 5,525,397, incorporated hereinbefore, can provide this benefit, albeit to a lesser extent than the preferred structures herein, and therefore it is important to provide this information on the package, or in association with the package, so as to encourage the use of the sheets, including those of the said '397 patent, especially on non-traditional surfaces like walls, ceilings, upholstery, drapes, rugs, clothing, etc., where dusting sheets have not normally been used. The use of a low level of additive, uniformly attached on at least one, preferably continuous area of the sheet in an effective amount to improve the adherence of soil, especially particulates, and especially those particulates that provoke an allergic reaction, provides a surprising level of control over soil adherence. At least in those areas where the additive is present on the sheet, the low level is important for such use, since, unlike traditional dusting operations where oils are applied as liquids, or as sprays, there is much less danger of creating a visible stain, especially on such non-traditional surfaces, when the sheet is used. The preferred structures also provide benefits by trapping larger particles rather than abrading them to smaller sizes.

Consumers with allergies especially benefit from the use of the sheets herein, especially the preferred structures, since allergens are typically in dust form and it is especially desirable to reduce the level of small particles that are respirable. For this benefit, it is important to use the sheets on a regular basis, and not just when the soil becomes visually apparent, as in prior art procedures.

The cleaning sheets of the present invention can be made using either a woven or nonwoven process, or by forming operations using melted materials laid down on forms, especially in belts, and/or by forming operations involving mechanical actions/modifications carried out on films. The structures are made by any number of methods, once the essential three dimensional requirements are known. However, the preferred structures are nonwoven, and especially those formed by hydroentanglement as is well known in the art, since they provide highly desirable open structures. Therefore, preferred cleaning sheets useful herein are nonwoven structures having the characteristics described herein. Materials particularly suitable for forming the preferred nonwoven cleaning sheet of the present invention include, for example, natural cellulosics as well as synthetics such as polyolefins (e.g., polyethylene and polypropylene), polyesters, polyamides, synthetic cellulosics (e.g., RAYON®), and blends thereof. Also useful are natural fibers, such as cotton or blends thereof and those derived from various cellulosic sources. Preferred starting materials for making the hydroentangled fibrous sheets of the present invention are synthetic materials, which can be in the form of carded, spunbonded, meltblown, airlaid, or other structures. Particularly preferred are polyesters, especially carded polyester fibers. The degree of hydrophobicity or hydrophilicity of the fibers is optimized depending upon the desired goal of the sheet, either in terms of type of soil to be removed, the type of additive that is provided, when an additive is present, biodegradability, availability, and combinations of such considerations. In general, the more biodegradable materials are hydrophilic, but the more effective materials tend to be hydrophobic.

The cleaning sheets can be formed from a single fibrous layer, but preferably are a composite of at least two separate layers. Preferably, the sheets are nonwovens made via a hydroentangling process. In this regard, prior to hydroentangling discrete layers of fibers, it may be desired to slightly entangle each of the layers prior to joining the layers by entanglement.

In a particularly preferred embodiment of the present invention, to enhance the integrity of the final sheet, it is preferred to include a polymeric net (referred to herein as a "scrim" material) that is arranged with the fibrous material, e.g., though lamination via heat or chemical means such as adhesives, through hydroentanglement, etc. Scrim materials useful herein are described in detail in U.S. Pat. No. 4,636,419, which is incorporated by reference herein. The scrims can be formed directly at the extrusion die or can be derived from extruded films by fibrillation or by embossing, followed by stretching and splitting. The scrim can be derived from a polyolefin such as polyethylene or polypropylene, copolymers thereof, poly(butylene terephthalate), polyethylene terephthalate, Nylon 6, Nylon 66, and the like. Scrim materials are available from various commercial sources. A preferred scrim material useful in the present invention is a polypropylene scrim, available from Conwed Plastics (Minneapolis, Minn.).

In another aspect of the present invention, Applicants have also discovered that the incorporation of the scrim material into a cleaning sheet, followed by heating, provides macroscopic three dimensional character to the sheet. This macroscopic three-dimensionality has been found to greatly enhance cleaning performance of the cleaning sheet, even where the basis weight of the sheet is essentially uniform. In particular, macroscopic three-dimensionality is achieved when the scrim/fiber composite is subjected to heating, then cooling. This process results in shrinkage (in the X-Y dimension) of the scrim and, as a result of its being attached with the fibers, provides a sheet with greater three-dimensionality. The degree of added three-dimensionality is controlled by the level of heating applied to the scrim/cleaning combination. The inclusion of a scrim is particularly beneficial when the fiber aspect of the structure is a nonwoven, particularly when the structure is hydroentangled.

In this aspect, the invention relates to macroscopically three-dimensional cleaning sheets. These sheets are preferably relatively open structures compared to, e.g., paper towels. In one preferred embodiment, the macroscopically three-dimensional cleaning sheets have a first surface and a second surface and comprise a scrim material. In one such preferred embodiment, the cleaning sheet has a first outward surface and a second outward surface and comprises a scrim material, wherein the Average Peak to Peak Distance of at least one outward surface is at least about 1 mm and the Surface Topography Index of that surface(s) is from about 0.01 to about 5.

Regardless of the configuration of the cleaning sheets, the Average Peak to Peak Distance of at least one outward surface will be at least about 1 mm, more preferably at least about 2 mm, and still more preferably at least about 3 mm. In one embodiment, the Average Peak to Peak distance is from about 1 to about 20 mm, particularly from about 3 to about 16 mm, more particularly from about 4 to about 12 mm. The Surface Topography Index of at least one outward surface will be from about 0.01 to about 10, preferably from about 0.1 to about 5, more preferably from about 0.2 to about 3, still more preferably from about 0.3 to about 2. While not critical, at least one outward surface will preferably have an Average Height Differential of at least about 0.5 mm, more preferably at least about 1 mm, and still more preferably at least about 1.5 mm. The Average Height Differential of at least one outward surface will typically be from about 0.5 to about 6 mm, more typically from about 1 to about 3 mm.

Again with regard to the macroscopic three-dimensional cleaning sheets of the present invention, these structures will provide enhanced elongation, particularly in the CD direction, that will improve their conformability, whether used as a stand alone product or when used in combination with a cleaning implement. In this regard the macroscopically three-dimensional sheets will preferably have a CD elongation value at 500 g of at least about 3%, more preferably at least about 6%, more preferably at least about 10%, still more preferably at least about 15%, and still more preferably 20%.

The cleaning performance of any of the cleaning sheets of the present invention can be further enhanced by treating the fibers of the sheet, especially surface treating, with any of a variety of additives, including surfactants or lubricants, that enhance adherence of soils to the sheet. When utilized, such additives are added to the cleaning sheet at a level sufficient to enhance the ability of the sheet to adhere soils. Such additives are preferably applied to the cleaning sheet at an add-on level of at least about 0.01%, more preferably at least about 0.1%, more preferably at least about 0.5%, more preferably at least about 1%, still more preferably at least about 3%, still more preferably at least about 4%, by weight. Typically, the add-on level is from about 0.1 to about 25%, more preferably from about 0.5 to about 20%, more preferably from about 1 to about 15%, still more preferably from about 3 to about 10%, still more preferably from about 4 to about 8%, and most preferably from about 4 to about 6%, by weight. A preferred additive is a wax or a mixture of an oil (e.g., mineral oil, petroleum jelly, etc.) and a wax. Suitable waxes include various types of hydrocarbons, as well as esters of certain fatty acids (e.g., saturated triglycerides) and fatty alcohols. They can be derived from natural sources (i.e., animal, vegetable or mineral) or can be synthesized. Mixtures of these various waxes can also be used. Some representative animal and vegetable waxes that can be used in the present invention include beeswax, carnauba, spermaceti, lanolin, shellac wax, candelilla, and the like. Representative waxes from mineral sources that can be used in the present invention include petroleum-based waxes such as paraffin, petrolatum and microcrystalline wax, and fossil or earth waxes such as white ceresine wax, yellow ceresine wax, white ozokerite wax, and the like. Representative synthetic waxes that can be used in the present invention include ethylenic polymers such as polyethylene wax, chlorinated naphthalenes such as "Halowax," hydrocarbon type waxes made by Fischer-Tropsch synthesis, and the like.

When a mixture of mineral oil and wax is utilized, the components will preferably be mixed in a ratio of oil to wax of from about 1:99 to about 7:3, more preferably from about 1:99 to about 1:1, still more preferably from about 1:99 to about 3:7, by weight. In a particularly preferred embodiment, the ratio of oil to wax is about 1:1, by weight, and the additive is applied at an add-on level of about 5%, by weight. A preferred mixture is a 1:1 mixture of mineral oil and paraffin wax.

Particularly enhanced cleaning performance is achieved when macroscopic three-dimensionality and additive are provided in a single cleaning sheet. As discussed hereinbefore, these low levels are especially desirable when the additives are applied at an effective level and preferably in a substantially uniform way to at least one discrete continuous area of the sheet. Use of the preferred lower levels, especially of additives that improve adherence of soil to the sheet, provides surprisingly good cleaning, dust suppression in the air, preferred consumer impressions, especially tactile impressions, and, in addition, the additive can provide a means for incorporating and attaching perfumes, pest control ingredients, antimicrobials, including fungicides, and a host of other beneficial ingredients, especially those that are soluble, or dispersible, in the additive. These benefits are by way of example only. Low levels of additives are especially desirable where the additive can have adverse effects on the substrate, the packaging, and/or the surfaces that are treated.

The application means for these additives preferably applies at least a substantial amount of the additive at points on the sheet that are "inside" the sheet structure. It is an especial advantage of the three dimensional structures that the amount of additive that is in contact with surface to be treated, and/or the package, is limited, so that materials that would otherwise cause damage, or interfere with the function of the other surface, can only cause limited, or no, adverse effects. The presence of the additive inside the structure is very beneficial in that soil that adheres inside the structure is much less likely to be removed by subsequent wiping action.

FIG. 1 illustrates a multiple layer cleaning sheet 20 according to the present invention. The cleaning sheet 20 includes side edges 22 and end edges 24. The side edges 22 extend generally parallel to the length of the sheet 20, and the end edges 24 extend generally parallel to the width of the sheet. Optionally, the sheet 20 can include an edge seal 26 extending around the perimeter of the sheet. Such an edge seal 26 can be formed by heating, by use of adhesives, or by a combination of heating and adhesives.

The cleaning sheet 20 includes a first layer 100 and a second layer 200. Preferably, the cleaning sheet also includes a third layer 300. The second layer 200 can be disposed between the first layer 100 and the third layer 300. In FIG. 1, a portion of the first layer 100 is shown cut away to reveal underlying portions of the second layer 200 and the third layer 300.

The first layer 100 can be formed from woven materials, nonwoven materials, paper webs, foams, battings, and the like such as are known in the art. Particularly preferred materials are nonwoven webs having fibers or filaments distributed randomly as in "air-laying" or certain "wet-laying" processes, or with a degree of orientation, as in certain "wet-laying" and "carding" processes. The fibers or filaments of the first layer 100 can be natural, or of natural origin (e.g. cellulosic fibers such as wood pulp fibers, cotton linters, rayon, and bagasse fibers) or synthetic (e.g. polyolefins, polyamides or polyesters). The third layer 300 can be substantially the same as the first layer 100, or alternatively, can be of a different material and/or construction.

In one embodiment, the first layer 100 and the third layer 300 can each comprise a hydroentangled web of synthetic nonwoven fibers having a denier of less than about 4.0, preferably less than about 3.0, more preferably less than about 2.0 grams, per 9000 meter of fiber length. A suitable first layer 100 (as well as a suitable third layer 300) is a hydroentangled web of polyester fibers having a denier of about 1.5 grams or less per 9000 meters of fiber length, and the web having a basis weight of about 30 grams per square meter. A suitable web is available from PGI Nonwovens of Benson, N.C. under the designation PGI 9936.

The second layer 200 is joined in a discontinuous manner to the first layer 100 (and to third layer 300 when present), and provides gathering of the first layer by contraction of the second layer. Contraction mechanisms include, but are not limited to, heat contraction and elastic properties of the second layer. As discussed above, in one such embodiment, the second layer 200 comprises a net-like arrangement of filaments having openings defined by adjacent filaments. Alternatively, the second layer could be in the form of a polymeric film, which can optionally have openings therethrough; to provide the requisite contraction mechanism, such films must have sufficient elasticity to provide the gathering function that results in surface three dimensionality. The film can be embossed so as to provide surface depressions instead of or in addition to openings. In another alternative, the contractile effects can be generated by inclusion of fibers that contract upon heating and recooling. In this approach, certain of the fibers will not shrink, but because they are mechanically associated to the shrinkable fibers, the entire sheet will "pucker" on contraction of the shrinkable fibers, so long as such fibers are included at a sufficient level.

In the embodiments illustrated, the second layer comprises a net like arrangement of filaments including a first plurality of filaments 220 and a second plurality of filaments 240. The filaments 220 extend generally parallel to one another, and the filaments 240 extend generally parallel to one another and generally perpendicular to the filaments 220. The filaments extend between filament intersections 260. The intersecting, adjacent filaments 220 and 240 define openings 250 in the second layer 200. The filament intersections and openings 250 are arranged in a generally nonrandom, repeating grid-like pattern.

The second layer 200 can comprise a polymeric net (referred to herein as a "scrim material"). Suitable scrim materials are described in U.S. Pat. No. 4,636,419 incorporated herein by reference. The scrim can be derived from a polyolefin such as polyethylene or polypropylene, or copolymers thereof, poly(butylene terephthalate), polyethylene terephthalate, Nylon 6, Nylon 66, and the like, and mixtures thereof.

The scrim material is preferably joined to the layers 100 and 300 through lamination via heat or chemical means such as adhesives. Preferably, the filaments of the scrim material contract relative to the layers 100 and 300 upon heating, such that contraction of the second layer 200 gathers the layers 100 and 300, and imparts a macroscopic three dimensional texture to the outer surfaces of the layers 100 and 300, as is described in more detail below.

A particularly suitable scrim material useful as the second layer 200 is a heat activated reinforcing netting available from Conwed Plastics of Minneapolis, Minn. as THERMA-NET brand reinforcing netting, having a polypropylene/EVA resin, 2 sided adhesive, and a filament count of 3 filaments per inch by 2 filaments per inch prior to contraction such as by heating. After heating, the second layer 200 can have between about 3.5 to 4.5 filaments per inch by between about 2.5 to 3.5 filaments per inch.

By "2 sided adhesive" it is meant that the EVA adhesive (Ethyl-Vinyl Acetate adhesive) is present on both sides of the filaments. The activation temperature of the EVA is generally about 85° C. (about 185° F.). During lamination of the layer 200 to the polyester fibers of the layers 100 and 300, the EVA adhesive is activated to provide bonding between the filaments of the layer 200 and the fibers of the layers 100 and 300. Without being limited by theory, it is believed that pressing at a relatively low pressure (e.g. less than 50 psi and more preferably less than 25 psi) for a relatively short time (e.g. less than about 30 seconds), the filaments of the layer 200 are not continuously bonded to the nonwovens of layers 100 and 300. This discontinuous bonding, along with the shrinkage of the polypropylene filaments upon heating, provides enhanced texture of the outward surfaces of layers 100 and 300.

In FIG. 1, the filaments 220 extend generally parallel to the side edges 22 and to the length of the sheet 20. Likewise, the filaments 240 extend generally parallel to the end edges 24 and to the width of the sheet 20.

Alternatively, the filaments 220 can be inclined at an angle of between about 20 and about 70 degrees with respect to the length of the sheet 20 and the side edges 22, and more preferably between about 30 degrees and about 60 degrees. The filaments 240 can be inclined at an angle of between about 20 and about 70 degrees with respect to the width of the sheet 20 and the end edges 24, and more preferably between about 30 degrees and about 60 degrees.

Figure 2:
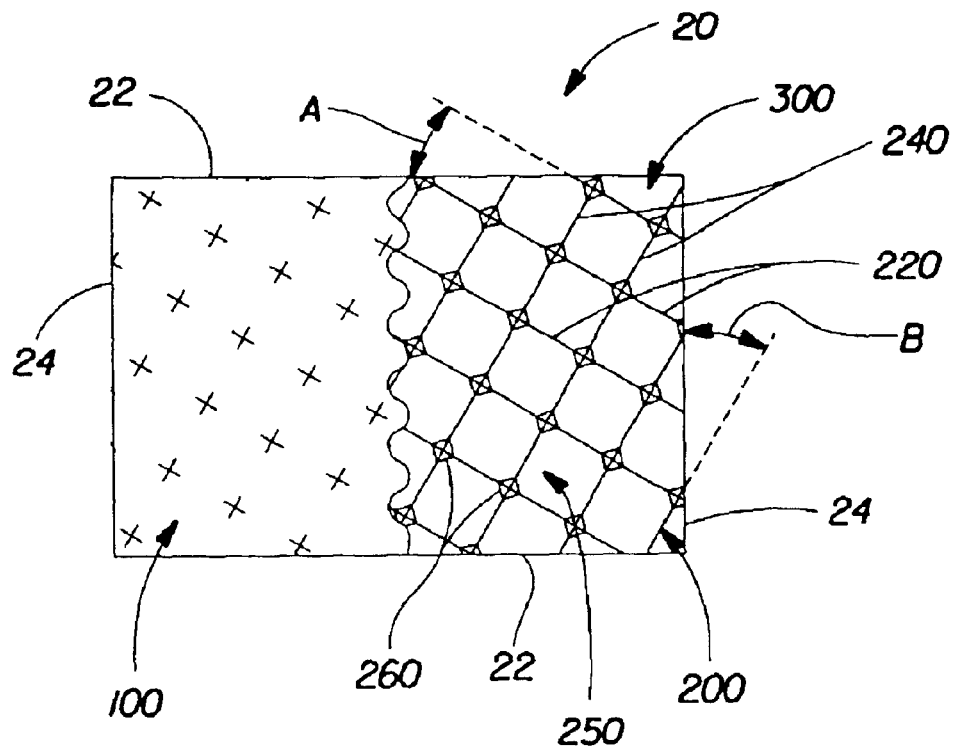
FIG. 2 is an illustration of the type shown in FIG. 1 depicting an alternative embodiment of the present invention wherein the filaments of the second layer are inclined at an angle of about 45 degrees relative to the side and end edges of the cleaning sheet.

FIG. 2 shows an embodiment of the present invention wherein the filaments 220 are inclined at an angle of about 45 degrees with respect to the side edges 22 (Angle A in FIG. 2), and wherein the filaments 240 are inclined at an angle of about 45 degrees with respect to the end edges 24 (Angle B in FIG. 2). Such an arrangement provides the advantage that the angled orientation of the filaments 220 and 240 with respect to the length and width of the sheet 20 permits deformation of the net structure of layer 200 parallel to the edges 22 and 24. Such deformation provides the sheet with elastic like behavior parallel to the length and width of the sheet.

By "elastic like behavior" it is meant that the element in question can be elongated under tension in a direction to have an elongated dimension measured in that direction which is at least 120 percent of the element's original, relaxed dimension in that direction, and that upon release of the elongating tension the element recovers to within 10 percent of its relaxed dimension.

An important aspect of one embodiment of the present invention is that the first layer 100 is intermittently bonded to the second layer 200. In particular, the first layer 100 can be intermittently bonded to the second layer 200 at the filament intersections 260, while portions of the filaments 220, portions of the filaments 240, or portions of both the filaments 220 and 240 intermediate the filament intersections 260 remain unbonded to the first layer 100.

As a result, the surface texture of the outer surface of the first layer 100 is not limited by the geometry of the openings in the net-like arrangement of filaments, but rather, is decoupled from the repeating, nonrandom geometry of the openings 250. Similarly, the third layer 300 can be intermittently bonded to the second layer 200 to provide similar surface texture to the outer surface of the third layer 300.

The surface texture of the first layer 100 is omitted in FIGS. 1 and 2 for clarity. The surface texture is shown in FIGS. 3-8.

Figure 3:
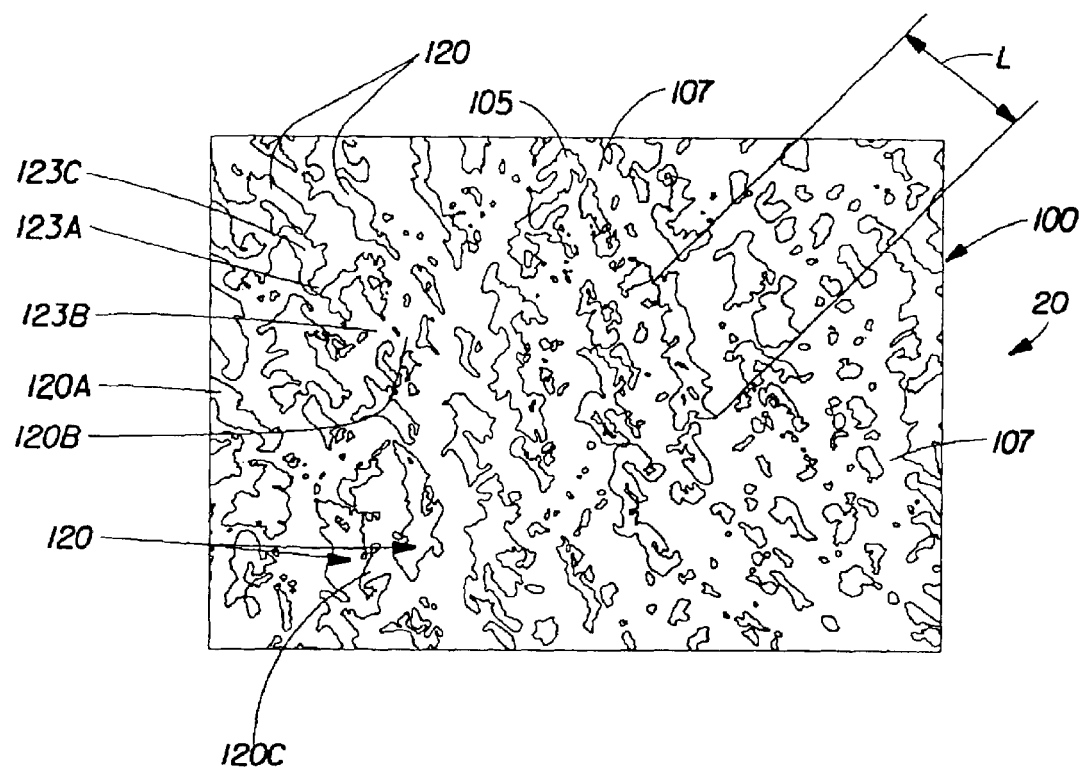
FIG. 3 is a plan view schematic illustration of the photograph of FIG. 5 showing the texture of the macroscopically three-dimensional outer surface of the first layer, and particularly the extended ridges on the outer surface of the first layer.
Figure 5:
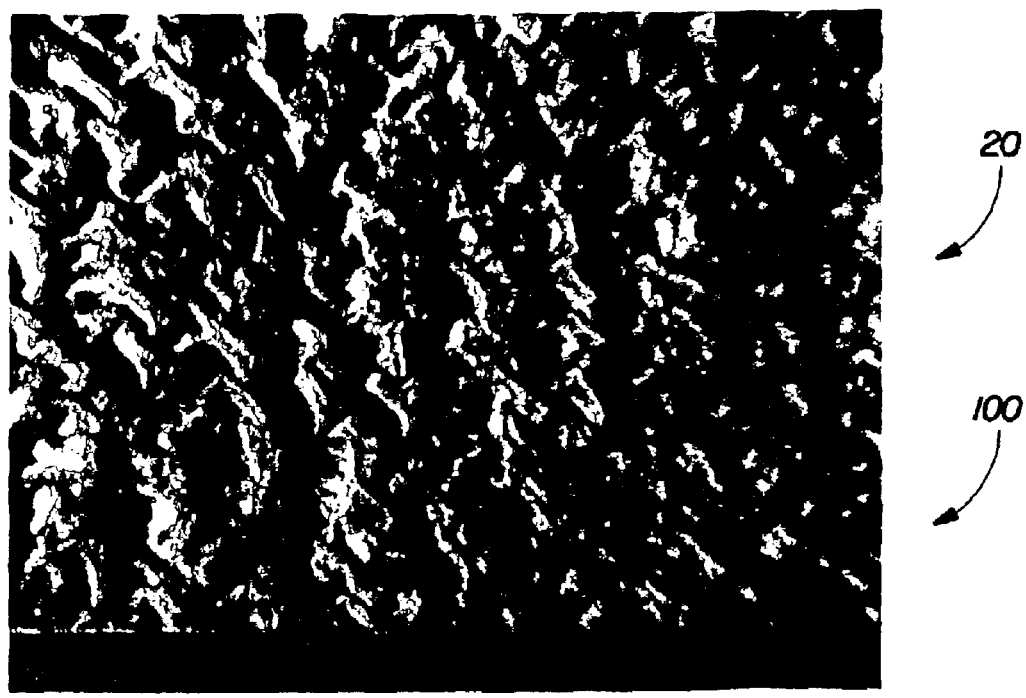
FIG. 5 is a photomicrograph showing the texture of the macroscopically three dimensional surface of the first layer, and in particular the elongated ridges of the surface. The scale in FIG. 5 is in inches.

FIG. 3 provides a schematic illustration of the surface texture of first layer 100 shown in the photograph of FIG. 5.

Figure 4:
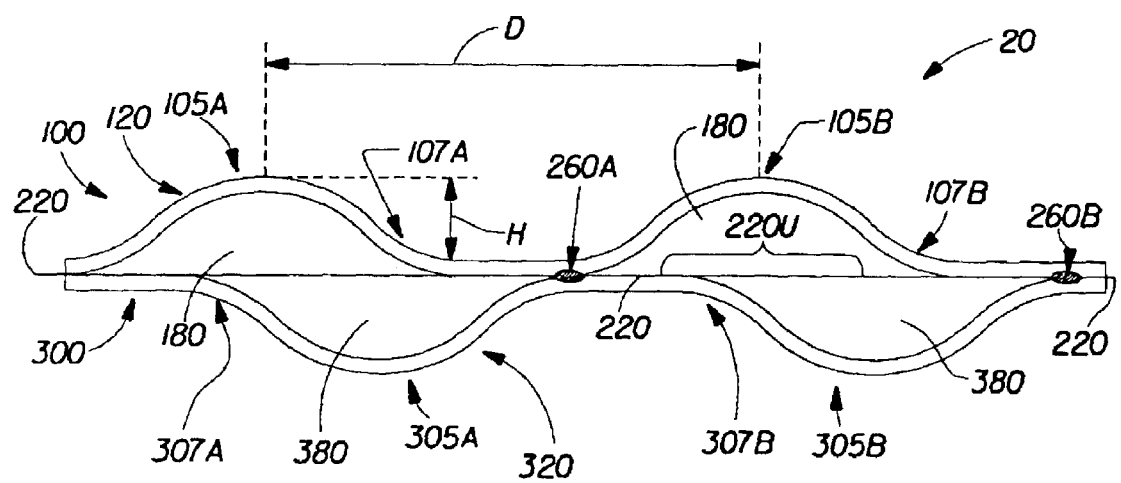
FIG. 4 is a cross-sectional illustration of the sheet taken parallel to one of the filaments of the second layer and showing portions of the filament extending intermediate the filament intersections, the portions of the filament that are not bound to the first layer, as well as portions of the filaments extending intermediate the filament intersections which are not bound to the third layer.
Figure 6:
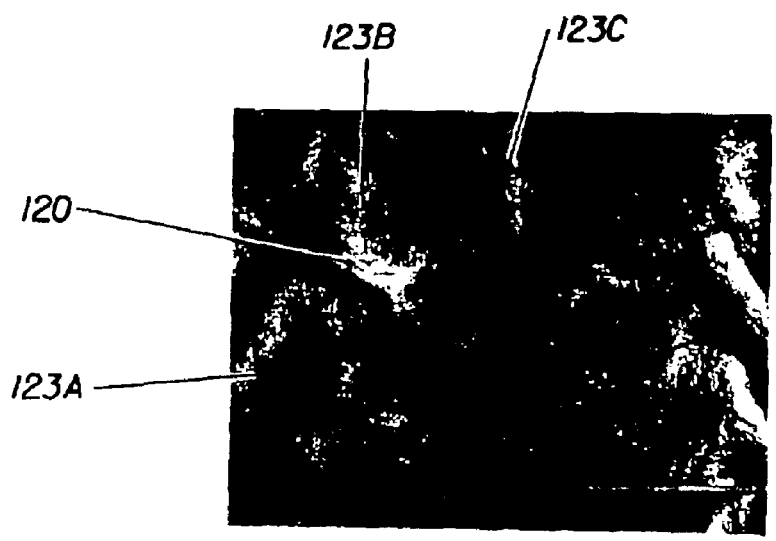
FIG. 6 is a enlarged photomicrograph of the type shown in FIG. 5 showing an elongated ridge having branches extending in different directions.
Figure 7:
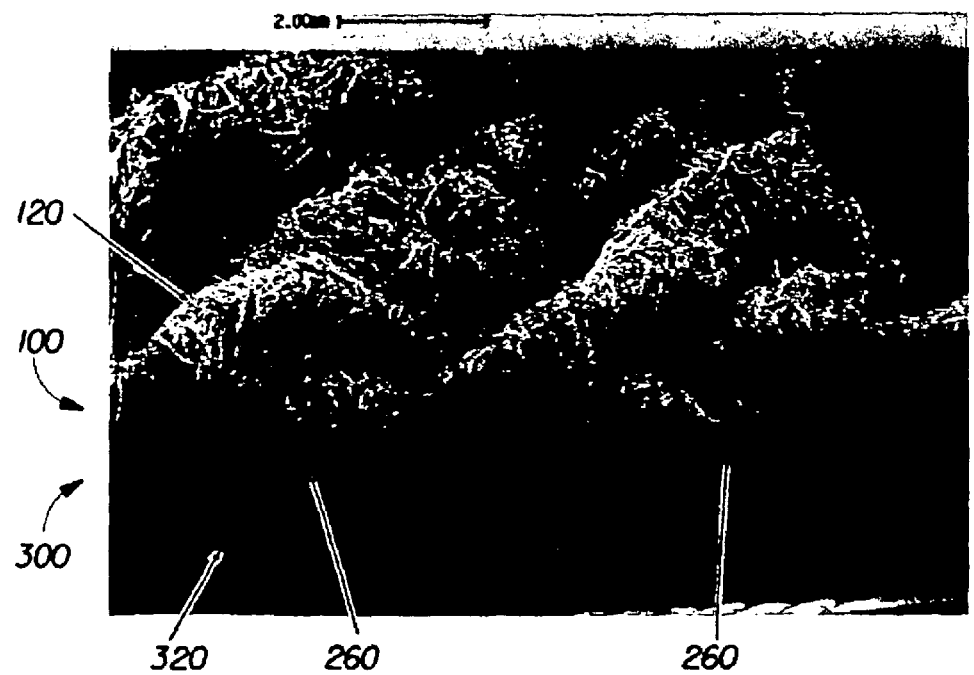
FIG. 7 is a Scanning Electron Micrograph providing a perspective view of the macroscopically three dimensional surface of the first layer.
Figure 8:
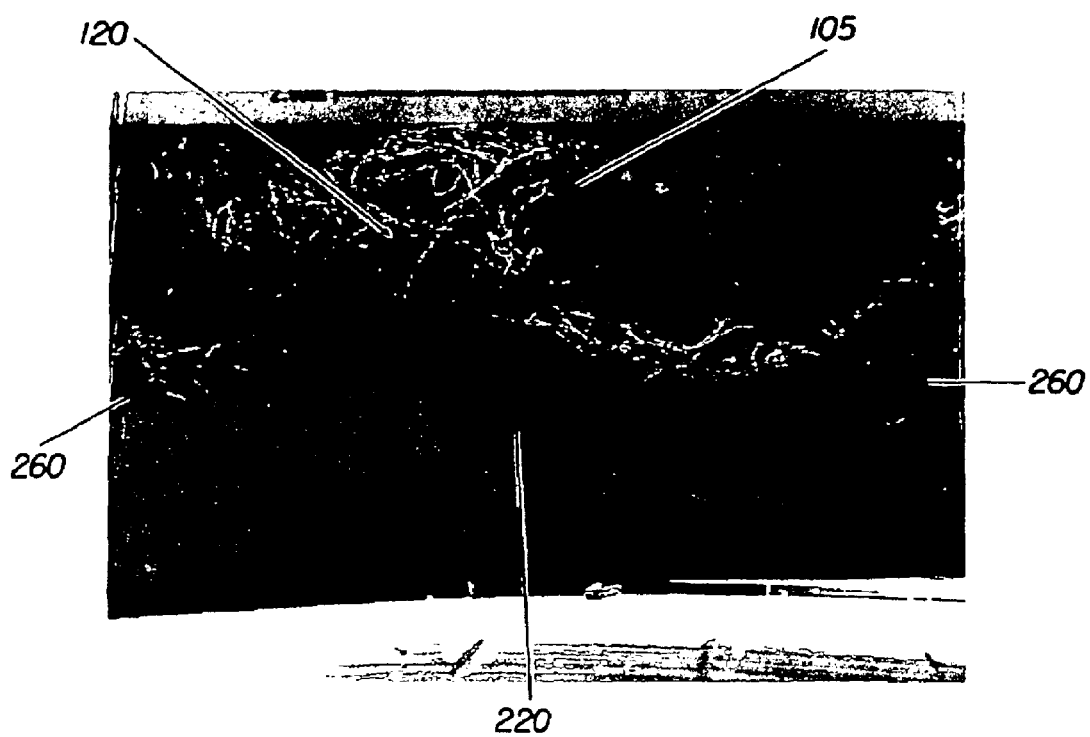
FIG. 8 is a Scanning Electron Micrograph of a cross-section of the cleaning sheet showing portions of filaments extending intermediate filament intersections, which portions of the filaments are unbonded to the first layer.

FIG. 4 provides a cross-sectional illustration of the surface texture of the first layer 100 and the third layer 300. FIG. 5 is a photomicrograph showing the texture of the macroscopically three dimensional surface of the first layer 100. FIG. 6 is a photomicrograph showing the three dimensional surface of the first layer 100 enlarged. FIG. 7 is a scanning electron micrograph providing a perspective view of the three dimensional surface of the first layer 100. FIG. 8 is a scanning electron micrograph of a cross-section of the sheet.

Referring to FIGS. 3–8, portions of the first layer 100 are gathered by contraction of the second layer 200 relative to the first layer 100. This gathering provides the first layer 100 with a macroscopically three dimensional surface as illustrated in FIG. 3–8. Likewise, the third layer 300 can be gathered by contraction of the second layer 200 to provide the third layer 300 with a macroscopically three dimensional surface.

The three dimensional surface of the first layer 100 has relatively elevated peaks 105 and relatively depressed valleys 107. The third layer has peaks 305 and valleys 307. In FIG. 4, the peaks of layer 100 are indicated with reference numbers 105A and 105B, and the valleys of layer 100 are indicated with reference numbers 107A and 107B. Similarly, the peaks of layer 300 are labeled 305A and 305B, and the valleys are labeled 307A and 307B. The peaks 105 provide elongated ridges 120 on the outward surface of the first layer 100, and the peaks 305 provide elongated ridges 320 on the outward surface of the third layer 300.

The macroscopic three-dimensionality of the outer surface of the first layer 100 can be described in terms of the "Average Height Differential" of a peak and an adjacent valley, as well as in terms of the "Average Peak-to-Peak Distance" between adjacent peaks. The height differential with respect to a peak 105A/valley 107A pair is the distance H in FIG. 4. The peak-to-peak distance between an adjacent pair of peaks 105A and 105B is indicated as distance D in FIG. 4. The "Average Height Differential" and the "Average Peak-to-Peak Distance" for the sheet are measured as set forth below in "Test Methods." The "Surface Topography Index" of the outward surface is the ratio obtained by dividing the Average Height Differential of the surface by the Average Peak to Peak Distance of the surface.

It will be apparent to one skilled in the art that there will be relatively small regions of peaks and valleys that are not significant enough to be considered as providing macroscopic three dimensionality. For example, such regions can exist in the element(s) that is eventually contracted by, for example, an elastic material to provide three-dimensionality. Again, such fluctuations and variations are a normal and expected result of the manufacturing process and are not considered when measuring Surface Topography Index.

Without being limited by theory, it is believed that the Surface Topography Index is a measure of the effectiveness of the macroscopically three dimensional surface in receiving and containing material in the valleys of the surface. A relatively high value of Average Height Differential for a given Average Peak to Peak Distance provides deep, narrow valleys which can trap and hold materials. Accordingly, a relatively high value of Surface Topography Index is believed to indicate effective capture of materials during wiping.

The cleaning sheets of the present invention have the characteristic that portions of the filaments 220, portions of the filaments 240, or portions of both the filaments 220 and 240 of the second layer 200 are not bonded to the first layer 100. Referring to FIG. 4, a portion of a filament 220 extending intermediate filament intersections 260A and 260B is not bonded to the first layer 100. The portion of the filament 220 which is not bonded to the first layer 100 is indicated by reference number 220U. A gap between the filament 220 and the first layer 100 provides a void space 180 intermediate the first layer 100 and the filament 220. Similarly, portions of the filament 220 extending intermediate filament intersections 260 are not bonded to the third layer 300, thereby providing a void space 380 intermediate the third layer 300 and the filament 220.

FIGS. 7 and 8 also illustrate this characteristic of the sheet 20. In FIG. 7, elongated ridges 120 and 320 are visible on the outward surfaces of both the first and third layers 100, 300, respectively. In FIG. 8, a filament 220 is seen extending between two filament intersections 260. The portion of the filament extending between the two filament intersections is spaced from, and not bonded to, the first layer.

Ridges 120 are shown in plan view in FIG. 3 and FIG. 5. At least some of the ridges 120 extend across at least one filament of the second layer 200. In FIG. 4, the ridge 120 corresponding to peak 105A extends across at least one filament 220.

Because the ridges extend across one or more filaments, the ridges can have a length greater than the maximum distance between adjacent filament intersections 260 (the distance between adjacent filament intersections after contraction of layer 200 and gathering of layers 100 and 300). In particular, the length of the ridges 120 can be greater than the maximum dimension of the openings 250 in FIG. 1 (i.e. greater than the length of the diagonal extending across the rectangular openings 250). The length of a ridge 120 is indicated by the letter L in FIG. 3. The Length L is the straight line distance between two ends of a ridge 120, the ends of the ridge 120 being those points where a ridge 120 terminates at a valley 107.

The value of L can be at least about 1.0 centimeter, more particularly at least about 1.5 centimeter for some of the ridges 120. In one embodiment, at least some of the ridges 120 have a length L of at least about 2.0 centimeters. The length L can be at least twice the distance between adjacent filament intersections.

For instance, in order to determine the length of ridges 120 relative to the distance between adjacent filament intersections, the cleaning sheet 20 can be wetted and positioned on a light table or other suitable source of back lighting. Such back lighting, in combination with wetting of the cleaning sheet, can be used to make the filament intersections of the layer 200 visible through the layer 100, so that the lengths of ridges 120 relative to the distance between filament intersections can be measured with a scale.

The elongated ridges provide soft, deformable wiping elements for enhanced removal of material from the surface being cleaned. In contrast, if the filaments of the second layer were continuously bonded to the first and second layers, then any texture features of the first and third layers would be confined to the area associated with the openings 250 in the second layer 200.

At least some of the elongated ridges extend in a direction different from at least some of the other ridges. Referring to FIG. 3, the ridges 120A, 120B, and 120C each extend in a different direction. Accordingly, the sheet is effective in picking up material when the sheet is used to wipe in different directions.

FIGS. 3 and 6 also illustrate that at least some of the ridges 120 can have branches extending in different directions. In FIG. 3, a ridge 120 is shown having three branches 123A, 123B, and 123C extending in different directions. Likewise, FIG. 6 shows a ridge 120 having at least three branches labeled 123A, 123B, and 123C.

Figure 9:
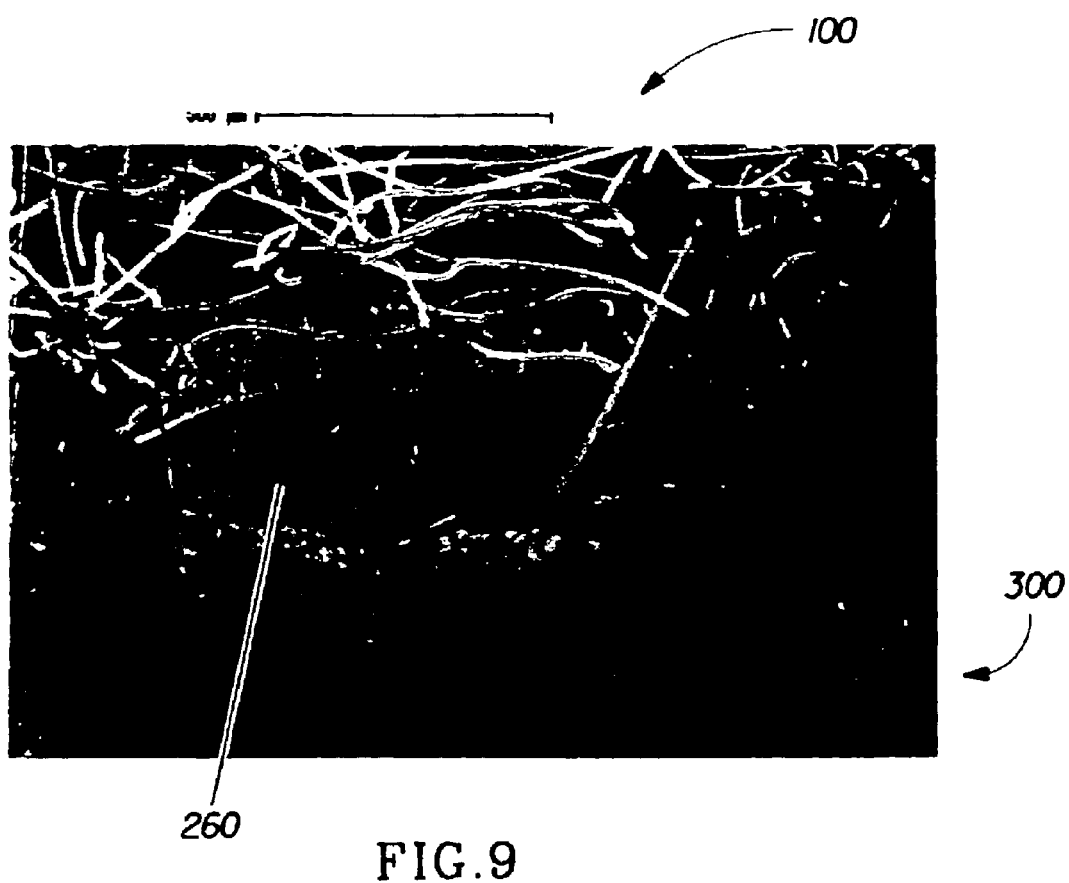
FIG. 9 is a Scanning Electron Micrograph showing bonding of the first and third layers to the second layer at the filament intersections.

The first layer 100 and the third layer 300 are securely bonded to the second layer 200 at the filament intersections 260. FIG. 9 illustrates the bonding of fibers of both the layers 100 and 300 to the second layer at a filament intersection 260.

Referring to FIGS. 4, 7 and 8, the peaks 105 of the first layer 100 are generally offset from the peaks 305 of the third layer in the plane of the sheet 20. For instance, in FIG. 4 the peak 305A of the third layer does not directly underlie the peak 105A, but instead is generally aligned with the valley 107A associated with peak 105A. Accordingly, the peaks 105 of the first layer are generally aligned with valleys 307 of the third layer, and the peaks 305 of the third layer are generally aligned with valleys 107 of the first layer.

The present invention also includes a method for making a multiple layer cleaning sheets. A first nonwoven layer, a second layer comprising a net like arrangement of filaments, and a third nonwoven layer are provided. The first layer is positioned adjacent an upper surface of the second layer, in face to face relationship with the second layer. The third layer is positioned adjacent a lower surface of the second layer, in face to face relationship with the second layer.

The first layer and the third layer are then intermittently bonded to discrete, spaced apart portions of the second layer, such that portions of the filaments extending between filament intersections remain unbonded to the first layer, and such that portions of the filaments extending between filament intersections remain unbonded to the third layer. The second layer is contracted relative to the first layer and the third layer to provide a gathered, macroscopically three dimensional outward surface of the first layer, and a gathered, macroscopically three dimensional outward surface of the third layer. The steps of bonding and contracting can occur simultaneously, or in sequence.

The step of intermittently bonding the second layer to the first layer and the third layer can comprise the step of heated pressing of the first layer, the second layer, and third layer at a relatively low pressure for a relatively short time period to avoid relatively continuous bonding of the second layer to the first and third layers.

In one embodiment, the three layers can be joined using a BASIX B400 hand press manufactured by the HIX Corp. of Pittsburg, Kans. The three layers are joined by pressing in the hand press at a temperature of about 330° F. for about 13 seconds. The hand press has an adjustment for varying the clearance, and hence the pressure, provided in the press. The adjustment can be varied as desired to provide the desired texture in the layers 100 and 300.

The invention also comprises packages containing cleaning sheets, the packages being in association with information that will inform the consumer, by words and/or by pictures, that use of the sheets will provide cleaning benefits which include soil (e.g., dust, lint, etc.) removal and/or entrapment and this information can comprise the claim of superiority over other cleaning products. In a highly desirable variation, the package bears the information that informs the consumer that the use of the cleaning sheet provides reduced levels of dust and other airborne matter in the atmosphere. It is very important that the consumer be advised of the potential to use the sheets on non-traditional surfaces, including fabrics, pets, etc., to ensure that the full benefits of the sheets is realized. Accordingly, the use of packages in association with information that will inform the consumer, by words and/or by pictures, that use of the compositions will provide benefits such as improved cleaning, reduction of particulate soil in the air, etc. as discussed herein, is important. The information can include, e.g., advertising in all of the usual media, as well as statements and icons on the package, or the sheet itself, to inform the consumer.

The prior products which do not comprise the preferred structures herein can be used to provide the benefits in a lesser degree, and to the extent that these benefits have not been previously recognized, they should be included in the information provided. Otherwise, the consumer will not obtain the full value of the improved performance relative to conventional products or practices.

III. Cleaning Implements

In another aspect, the present invention relates to a cleaning implement comprising the cleaning sheets discussed above. In this regard, the cleaning implement comprises:

a. a handle; and b. a removable cleaning sheet having a first surface and a second surface, wherein the Average Peak to Peak Distance is at least about 1.0 mm and the Surface Topography Index is from about 0.01 to about 5.

The implement and, separately, the cleaning sheet of the present invention are designed to be compatible with all hard surface substrates, including wood, vinyl, linoleum, no wax floors, ceramic, FORMICA®, porcelain, and the like.

The handle of the cleaning implement comprises any elongated, durable material that will provide ergonomically practical cleaning. The length of the handle will be dictated by the end-use of the implement.

The handle will preferably comprise at one end a support head to which the cleaning sheet can be releasably attached. To facilitate ease of use, the support head can be pivotably attached to the handle using known joint assemblies. Any suitable means for attaching the cleaning sheet to the support head can be utilized, so long as the cleaning sheet remains affixed during the cleaning process. Examples of suitable fastening means include clamps, hooks & loops (e.g., VELCRO®), and the like. In a preferred embodiment, the support head will comprise means for gripping the sheet on it's upper surface to keep the sheet mechanically attached to the head during the rigors of cleaning. However, the gripping means will readily release the sheet for convenient removal and disposable.

The cleaning sheets useful in the cleaning implement of the present invention are as described above.

IV. Test Methods

A. Average Height Differential

Average Height Differential is determined using a light microscope (e.g., Zeiss Axioplan, Zeiss Company, Germany) equipped with a Z-dimension measuring device (e.g., Microcode II, sold by Boeckeler, Instruments). This procedure involves locating a peak or valley region of the sheet, focusing the microscope and zeroing the Z-dimension measuring device. The microscope is then moved to an adjacent valley or peak region, respectively, and the microscope is refocused. The display of the instrument indicates the height difference between this peak/valley or valley/peak pair. This measurement is repeated at least 10 times, at random locations on the sheet, and the Average Height Differential is the average of these measurements.

B. Peak-to-Peak Distance

Simple light microscopy can be used to measure peak-to-peak distance. The magnification used should be sufficient to readily measure the distance between two adjacent peaks. This measurement is repeated at least 10 times, at random locations on the sheet, and the Average Peak-to-Peak Distance is the average of these measurements.

C. CD Elongation at 500 g

CD elongation is a measure of the percent elongation a test sample exhibits under a load of 500 g. CD Elongation can be measured using a Sintech Renew Instron 7310 (including the Testworks software package) with a 100N load cell. Using this instrument, a Load vs. % Strain curve is generated. The testing parameters are as follows:

Sample width=30 mm

Gauge Length=100 mm

Crosshead speed=300 mm/min

From the curve generated, the software obtains the % Strain (% Elongation) at a load of 500 g. This is reported as CD Elongation at 500 g.

V. REPRESENTATIVE EXAMPLES

The following are illustrative examples of cleaning sheets of the present invention. Enhanced three dimensionality is indicated in Table 1.

Example 1

This example illustrates the combination of carded webs and a scrim (i.e., a net of polypropylene filament) to make a cleaning sheet of the present invention. Two carded polyester fiber webs with a scrim in between is prepared. The combination of the two carded webs and the scrim are then placed on top of an apertured forming belt (N 50 flat square) and are hydroentangled and dried. The water entangling process causes the fibers to become intertangled and to also become intertangled with the scrim, while causing the fibers to move apart and provide two distinct basis weight regions. During the drying process, the hydroentangled sheet becomes "quilted" (i.e., greater three dimensionality is achieved) as a result of shrinkage of the polypropylene scrim relative to the polyester nonwoven. As a preferred optional step, the nonwoven sheet is surface coated (by, e.g., printing, spraying, etc.) with 5%, by weight, of a 1:1 mixture of mineral oil and paraffin wax. The entangled nonwoven sheet is subjected to further heating, for example in a press at 180° C. for 10 sec, to provide a greater degree of three dimensionality. This sheet is designated as Example 1 in Table 1. (This heating can may be performed before or after adding the optional surface treatment, but is preferably conducted prior to application of the additive.) This additional heating provides even further enhanced three-dimensionality.

Example 2

A cleaning sheet according to the present invention includes a first layer 100, a second layer 200, and a third layer 300. The first layer 100 and the third layer 300 each comprise a hydroentangled web of polyester fibers having a basis weight of about 30 grams per square meter. The second layer comprises the above described THERMANET® brand reinforcing netting having a polypropylene/EVA resin, 2 sided adhesive, and a filament count of 3 filaments per inch by 2 filaments per inch prior to contraction of the second layer. The second layer 200 is positioned between the first layer 100 and the third layer 300 in a BASIX B400 hand press. The three layers are joined by pressing in the hand press at a temperature setting of about 330° F. for about 13 seconds.

The wiping article has the measured values of Average Peak to Peak Distance, the Average Height Differential, and the Surface Topography Index, as set forth in Table I.

Comparative Example A

Comparative example A illustrates a nonwoven sheet having a uniform basis weight that is essentially planar. The sheet is commercially available from Kao Corporation, Tokyo, Japan, as QUICKLE®.

TABLE I

| Example # | Average Height Differential (mm) | Average Peak to Peak Distance (mm) | Surface Topography Index |
|---|---|---|---|
| 1 | 0.74 | 1.5 | 0.5 |
| 2 | 1.8 | 3 | 0.6 |
| Comparative A | 0.14 | 0.85 | 0.16 |

What is claimed is:

1. A macroscopically three-dimensional cleaning sheet having a first outward surface and a second outward surface, wherein at least one of the outward surfaces has a macroscopic three dimensional texture, said macroscopic three dimensional texture being defined by peaks and valleys that said textured outward surface has an Average Peak to Peak Distance of at least about 1 mm, an Average Height Differential of at least about 1 mm and a Surface Topography Index from about 0.01 to about 10 and wherein said cleaning sheet comprises an additive applied at a low effective level to provide improved adhesion of soil to the sheet.

2. The cleaning sheet of claim 1 wherein said Average Height Differential is from about 1 mm to about 3 mm.

3. The cleaning sheet of claim 1 wherein said Average Peak to Peak Distance is at least about 2 mm.

4. The cleaning sheet of claim 3 wherein said Average Peak to Peak Distance is at least about 3 mm.

5. The cleaning sheet of claim 1 wherein said Average Peak to Peak Distance is from about 1 to about 20 mm.

6. The cleaning sheet of claim 5 wherein said Average Peak to Peak Distance is from about 4 to about 12 mm.

7. The cleaning sheet of claim 5 wherein said Average Height Differential is between about 1 mm and about 3 mm.

8. The cleaning sheet of claim 1 wherein said Surface Topography Index is from about 0.1 to about 5.

9. The cleaning sheet of claim 8 wherein said Surface Topography Index is from about 0.2 to about 3.

10. The cleaning sheet of claim 9 wherein said Surface Topography Index is from about 0.3 to about 2.

11. The cleaning of claim 1 wherein said textured outward surface has an Average Peak to Peak Distance of from about 3 mm to a 16 mm, a Surface Topography Index of from about 0.1 to about 5, and an Average Height Differential of from about 1 mm to about 3 mm.

12. The cleaning sheet of claim 11 wherein said cleaning sheet is a hydroentangled cleaning sheet.

13. A cleaning implement comprising:
  a. a handle; and
  b. a removable cleaning sheet, wherein said cleaning sheet is the cleaning sheet of claim 11.

14. A method for removing dust from a said surface, said method comprising the step of contacting said surface with the cleaning sheet of claim 11.

15. The cleaning sheet of claim 1 wherein said textured outward surface has an Average Peak to Peak Distance of from about 4 mm to about 12 mm, a Surface Topography Index of from about 0.2 to about 3, and an Average Height Differential of from about 1 mm to about 3 mm.

16. The cleaning sheet of claim 15 wherein said cleaning sheet is a hydroentangled cleaning sheet.

17. A cleaning implement comprising:
a. a handle; and
b. a removable cleaning sheet, wherein said cleaning sheet is the cleaning sheet of claim 15.

18. A method for removing dust from a surface, said method comprising the step of contacting said surface with the cleaning sheet of claim 15.

19. The cleaning sheet of claim 1 wherein said cleaning sheet is a hydroentangled cleaning sheet.

20. The cleaning sheet of claim 1 wherein said additive is included at an add-on level of at least about 0.01%, by weight of the sheet.

21. The cleaning sheet of claim 20 wherein said additive is included at on add-on level of at least about 1%, by weight of the sheet.

22. The cleaning sheet of claim 21 wherein said additive is included at an add-on level of from about 1 to about 15%, by weight of the sheet.

23. The cleaning sheet of claim 22 wherein said additive is include at an add-on level of from about 3 to about 10%, by weight of the sheet.

24. The cleaning sheet of claim 1 wherein the additive is a mixture of mineral oil and a wax.

25. A cleaning implement comprising;
a. a handle; and
b. a removable cleaning sheet, wherein said cleaning sheet is the cleaning sheet of claim 1.

26. A method for removing dust from a surface, said method comprising the step of contacting said surface with the cleaning sheet of claim 1.

27. The cleaning sheet of claim 1 wherein said additive is a microcrystalline wax.

28. The cleaning sheet of claim 1 wherein said Average Height Differential is at least about 1.5 mm.

29. The cleaning sheet of claim 28 wherein said additive is included at an add-on level of at least about 0.01%, by weight of the sheet.

30. The cleaning sheet of claim 29 wherein said additive is selected from the group consisting of wax, oil, and mixtures thereof.

31. A macroscopically three-dimensional cleaning sheet having a first outward surface and a second outward surface, wherein at least one of the outward surfaces has macroscopic three dimensional texture, said macroscopic three dimensional texture being defined by peaks and valleys such that said textured outward surface has (i) an Average Peak to Peak Distance of from about 1 mm to about 20 mm; (ii) a Surface Topography Index from about 0.2 to about 3; and (iii) an Average Height Differential of at least about 1 mm and wherein said cleaning sheet comprise an additive applied at a low effective level to provide improved adhesion of soil to the sheet.

32. The cleaning sheet of claim 31 wherein said Average Peak to Peak Distance is from about 4 to about 12.

33. The cleaning sheet of claim 31 wherein said Surface Topography Index is from about 0.3 to about 2.

34. A cleaning implement comprising:
a. a handle; and
b. a removable cleaning sheet, wherein said cleaning sheet is the cleaning sheet of claim 31.

35. A method for removing dust from a surface, said method comprising the step of contacting said surface with the cleaning sheet of claim 31.

36. The cleaning sheet of claim 31 wherein said additive is a microcrystalline wax.

37. A macroscopically three-dimensional, hydroentangled, nonwoven cleaning sheet for removing dust from a surface, said cleaning sheet comprising at least two fibrous layers; wherein d fibrous layers are hydroentangled with each other, wherein said cleaning sheet has a first outward surface and a second outward surface, wherein at least one of said outward surfaces has a macroscopic three dimensional texture, said macroscopic three dimensional texture being defined by peaks and valleys such that said textured outward surface has an Average Peak to Peak Distance of from about 3 to about 16 mm, a Surface Topography Index of about 0.1 to about 5, and an Average Height Differential of at least about 1 mm and wherein said cleaning sheet comprises an additive selected from the group consisting of surfactant, wax, oil, and mixtures thereof; wherein said additive is included on said cleaning sheet at a level of from about 0.1% to about 25% by weight of said cleaning sheet.

38. The cleaning sheet of claim 37 wherein said cleaning sheet further comprises a scrim material; wherein said fibrous layers are hydroentangled with said scrim material.

39. The cleaning sheet of claim 38 wherein said scrim material is made of a material selected from the group consisting of polyethylene polypropylene, copolymers of polyethylene, copolymers of polypropylene, poly(butylene terephthalate), polyethylene terephthalate, nylon, and mixtures thereof.

40. The cleaning sheet of claim 39 wherein said scrim is made of polypropylene.

41. The cleaning sheet of claim 37 wherein said additive is a microcrystalline wax applied on at least one of said outward surfaces at a level of from about 0.1% to about 25% by weight of said cleaning sheet.

42. The cleaning sheet of claim 41 wherein said microcrystalline is applied to said textured outward surface.

43. The cleaning sheet of claim 37 wherein said additive is selected from the group consisting of wax, oil, and mixtures of wax and oil.

44. The cleaning sheet of claim 43 wherein said additive is a mixture of wax and oil.

45. The cleaning sheet of claim 44 wherein said mixture of wax and oil contains a ratio of said wax to said oil of from about 3:7 to about 99:1.

46. The cleaning sheet of claim 37 wherein said fibrous layers comprise fibers made of a material selected from the group consisting of natural cellulosic fibers, polyolefins, polyesters, polyamides synthetic cellulosic fibers, cotton fibers, and mixtures thereof.

47. The cleaning sheet of claim 46 wherein said fibers are made of polyester.

48. A cleaning implement comprising:
a. a handle; and
b. a removable cleaning sheet, wherein said cleaning sheet is the cleaning sheet of claim 37.

49. A method for removing dust from a surface, said method comprising the step of contacting said surface with the cleaning sheet of claim 37.

50. The cleaning sheet of claim 37 wherein said Average Height Differential is between about 1 mm and about 3 mm.

51. The cleaning sheet of claim 37 wherein said Average Height Differential is at least about 1.5 mm.

52. A macroscopically three-dimensional, hydroentangled, nonwoven cleaning sheet for removing dust from a surface, said cleaning sheet comprising at least two fibrous layers and a scrim material; wherein said fibrous layers are hydroentangled with said scrim material; wherein said cleaning sheet has a first outward surface and a second outward surface, wherein at least one of said outward surfaces a macroscopic three dimensional texture, said macroscopic three dimensional texture being defined by peaks and valleys such that said textured outward surface has an Average Peak to Peak Distance of from about 3 to about 16 mm, a Surface Topography Index from about 0.1 to about 5, and an Average Height Differential of from about 1 to about 3 mm and wherein said cleaning sheet comprises an additive selected from the group consisting of surfactant, wax, oil, and mixtures thereof, wherein said additive is included on said cleaning sheet at a level of from about 4% to about 8% by weight of said cleaning sheet.

53. The cleaning sheet of claim 52 wherein said additive is selected from the group consisting of wax, oil, and mixtures thereof.

54. The cleaning sheet of claim 52 wherein said fibrous layers comprise fibers made of a material selected from the group consisting of natural cellulosic fibers, polyolefins, polyesters, polyamides, synthetic cellulosic fibers, cotton fibers and mixtures thereof.

55. The clean sheet of claim 54 wherein said fibers are made of polyester.

56. The cleaning sheet of claim 52 wherein said scrim material is made of a material selected from the group consisting of polyethylene, polypropylene, copolymers of polyethylene, copolymers of polypropylene, poly(butylene terephthalate), polyethylene terephthalate, nylon, and mixtures thereof.

57. The cleaning sheet of claim 56 wherein said scrim material is made of polypropylene.

58. A cleaning implement comprising:
  a. a handle; and
  b. a removable cleaning sheet wherein said cleaning sheet is the cleaning sheet of claim 53.

59. A method for removing dust from a said surface, said method comprising the step of contacting said surface with the cleaning sheet of claim 52.

60. The cleaning sheet of claim 52 wherein said additive is a microcrystalline wax applied to at least one of said outward surfaces at a level of from about 0.1% to about 25% by weight of said cleaning sheet.

61. The cleaning sheet of claim 60 wherein said microcrystalline wax is applied to said textured outward surface.

62. The cleaning sheet of claim 52 wherein said scrim material is shrinkable such that said three-dimensional texture is formed on at least one of said outward surfaces when said hydroentangled cleaning sheet said with shrinkable scrim material is heated.

63. The cleaning sheet of claim 52 wherein said Average Height Differential is at least about 1.5 mm.

64. A macroscopically three-dimensional cleaning sheet having a first outward surface and a second outward surface, wherein at least one of the outward surfaces has a macroscopic three dimensional pattern, said macroscopic three dimensional pattern being defined by peaks and valleys such that said patterned outward surface has an Average Height Differential of a least about 1 mm.

65. The cleaning sheet of claim 64 wherein said Average Height Differential is at least about 1.5 mm.

66. The cleaning sheet of claim 64 wherein said Average Height Differential is from about 1 mm to about 3 mm.

67. The cleaning sheet of claim 64 wherein said patterned outward surface has an a Surface Topography Index from about 0.01 to about 10.

68. The cleaning sheet of claim 67 wherein said Surface Topography Index is from about 0.1 to about 5.

69. The cleaning sheet of claim 68 wherein said Surface Topography Index is from about 0.2 to about 3.

70. The cleaning sheet of claim 69 wherein said Surface Topography Index is from about 0.3 to about 2.

71. The cleaning sheet of claim 64 wherein said cleaning sheet further comprises an additive to provide improved adhesion of soil to the sheet, wherein said additive is included at an add-on level of at least about 0.01%, by weight of the sheet.

72. The cleaning sheet of claim 71 wherein said additive is included at an add-on level of from about 1 to about 15%, by weight of the sheet.

73. The cleaning sheet of claim 71 wherein said cleaning sheet comprises at least two fibrous layers and a scrim material; wherein said fibrous layers are hydroentangled with said scrim material.

74. The cleaning sheet of claim 73 wherein said scrim material is made of a material selected from the group consisting of polyethylene, polypropylene, copolymers of polyethylene, copolymers of polypropylene, poly(butylene terephthalate), polyethylene terephthalate, nylon, and mixtures thereof.

75. The cleaning sheet of claim 71 wherein said additive is selected from the group consisting of wax, oil, and mixtures thereof.

76. A cleaning implement comprising:
  a. a handle pivotably connected to a support head; and
  b. a disposable cleaning sheet removably attachable to said support head, wherein said cleaning sheet is the cleaning sheet of claim 64.

77. A method for removing dust from a surface, said method comprising the step of contacting said surface with the cleaning sheet of claim 64.

* * * * *